US012591596B2

(12) United States Patent
Bastiani et al.

(10) Patent No.: US 12,591,596 B2
(45) Date of Patent: Mar. 31, 2026

(54) HIERARCHICAL REGION OF INTEREST CLUSTERING

(71) Applicant: Expedia, Inc., Seattle, WA (US)

(72) Inventors: Matteo Bastiani, Geneva (CH);
Raphaël Hamez, Geneva (CH)

(73) Assignee: Expedia, Inc., Seattle, WA (US)

( * ) Notice: Subject to any disclaimer, the term of this
patent is extended or adjusted under 35
U.S.C. 154(b) by 0 days.

(21) Appl. No.: 18/762,321

(22) Filed: Jul. 2, 2024

(65) Prior Publication Data

US 2026/0010549 A1 Jan. 8, 2026

(51) Int. Cl.
*G06F 16/00* (2019.01)
*G06F 16/2455* (2019.01)
*G06F 16/28* (2019.01)
*G06F 16/29* (2019.01)

(52) U.S. Cl.
CPC ........ *G06F 16/285* (2019.01); *G06F 16/2455*
(2019.01); *G06F 16/29* (2019.01)

(58) Field of Classification Search
None
See application file for complete search history.

(56) References Cited

U.S. PATENT DOCUMENTS 11,238,065 B1    2/2022  Tang
2007/0094066 A1*  4/2007  Kumar ................... G06Q 10/04
                                                     706/61

2011/0078575 A1*  3/2011  Xiao ........................ G06F 16/29
                                                     715/738
2013/0290332 A1* 10/2013  Carlsson ............. G06F 16/9537
                                                     707/736
2018/0113880 A1   4/2018  Metcalf-Putnam et al.
2022/0383349 A1  12/2022  Yan et al.

OTHER PUBLICATIONS

International Search Report mailed Oct. 10, 2025, Patent Application No. PCT/US2025/035963, 4 pages.

* cited by examiner

*Primary Examiner* — Anhtai V Tran

(74) *Attorney, Agent, or Firm* — Davis Wright Tremaine LLP

(57) ABSTRACT

Systems and methods for clustering and organizing geographical locations into regions of interest (ROI) within a hierarchical graph. The ROI generation system may generate a graph containing geographical entities and the relationships between each geographical entity. Each geographical entity can be represented as a node, and the relationships between geographical entities may be represented as edges between nodes. Each edge may represent the relationship between the two geographical entities weighted based on an occurrence of both geographical entities appearing as search items within a user session. In addition, the ROI generation system may generate multiple levels within a graph corresponding to various resolutions of geographical entities. The ROI generation system may cluster geographical entities within the hierarchical graph into non-overlapping regions of interest, or clusters. Insights and metrics may be inferred from the hierarchical graph and presented to the user or third parties.

20 Claims, 8 Drawing Sheets

100

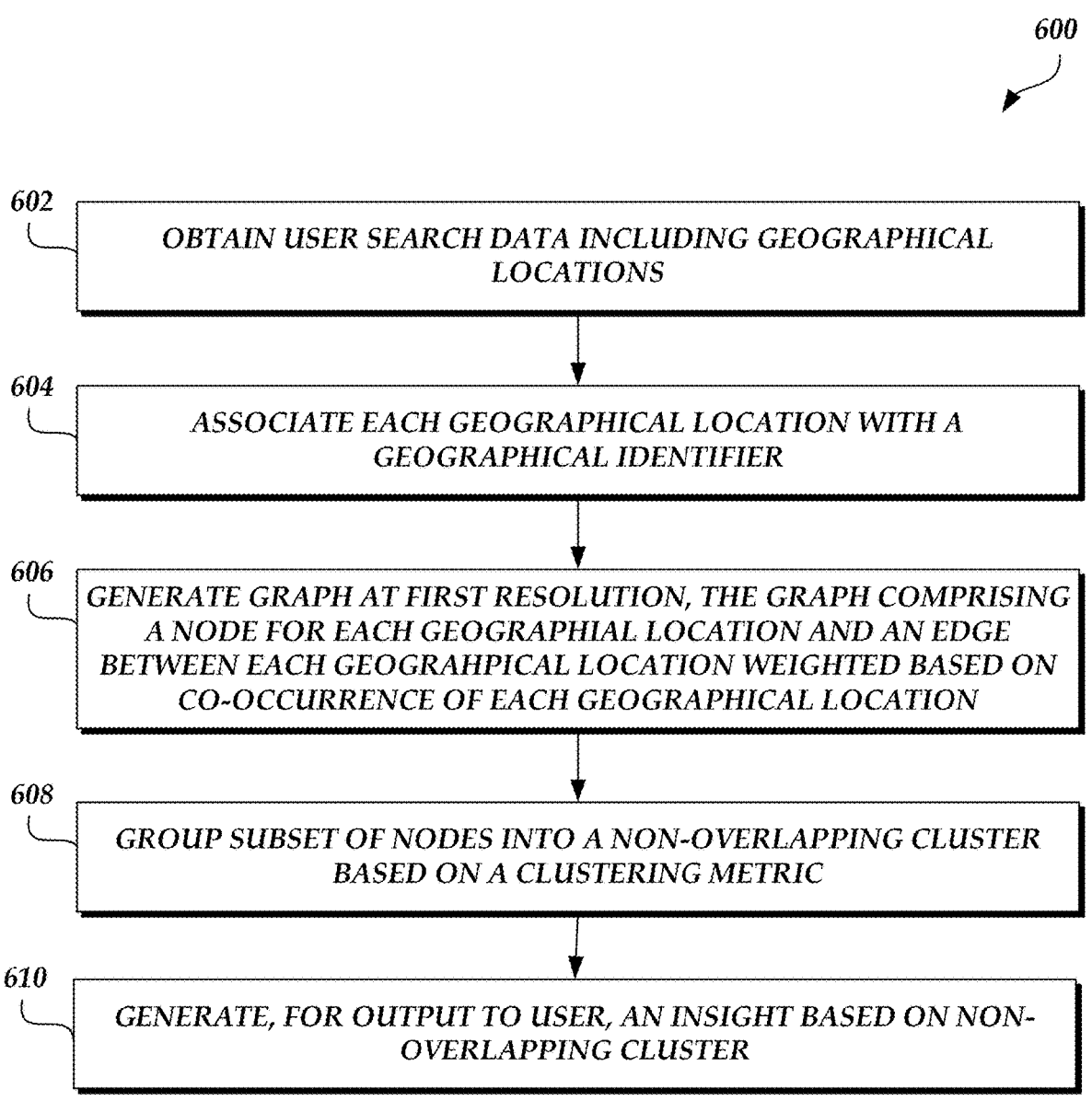

*600*

602   OBTAIN USER SEARCH DATA INCLUDING GEOGRAPHICAL LOCATIONS

604   ASSOCIATE EACH GEOGRAPHICAL LOCATION WITH A GEOGRAPHICAL IDENTIFIER

606   GENERATE GRAPH AT FIRST RESOLUTION, THE GRAPH COMPRISING A NODE FOR EACH GEOGRAPHIAL LOCATION AND AN EDGE BETWEEN EACH GEOGRAHPICAL LOCATION WEIGHTED BASED ON CO-OCCURRENCE OF EACH GEOGRAPHICAL LOCATION

608   GROUP SUBSET OF NODES INTO A NON-OVERLAPPING CLUSTER BASED ON A CLUSTERING METRIC

610   GENERATE, FOR OUTPUT TO USER, AN INSIGHT BASED ON NON-OVERLAPPING CLUSTER

*FIG. 6*

HIERARCHICAL REGION OF INTEREST CLUSTERING

BACKGROUND

Regions of interest are often located based on geography. Accurately defined regions of interest may be useful in organizing location-based items. To define a region of interest (ROI), clustering systems may aggregate geographical entities (e.g., cities, states, regions) into a "cluster" representing the relevant market within a geographical boundary. Clustering systems may take into account user demand in delineating the geographical boundary of a cluster. In some cases, clustering systems may also generate a hierarchical graph or tree to organize clustered geographical entities at scalable resolutions.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 6 is a flow diagram showing an example of hierarchical graph generation, according to various aspects of the present disclosure.

DETAILED DESCRIPTION

Figure 1:
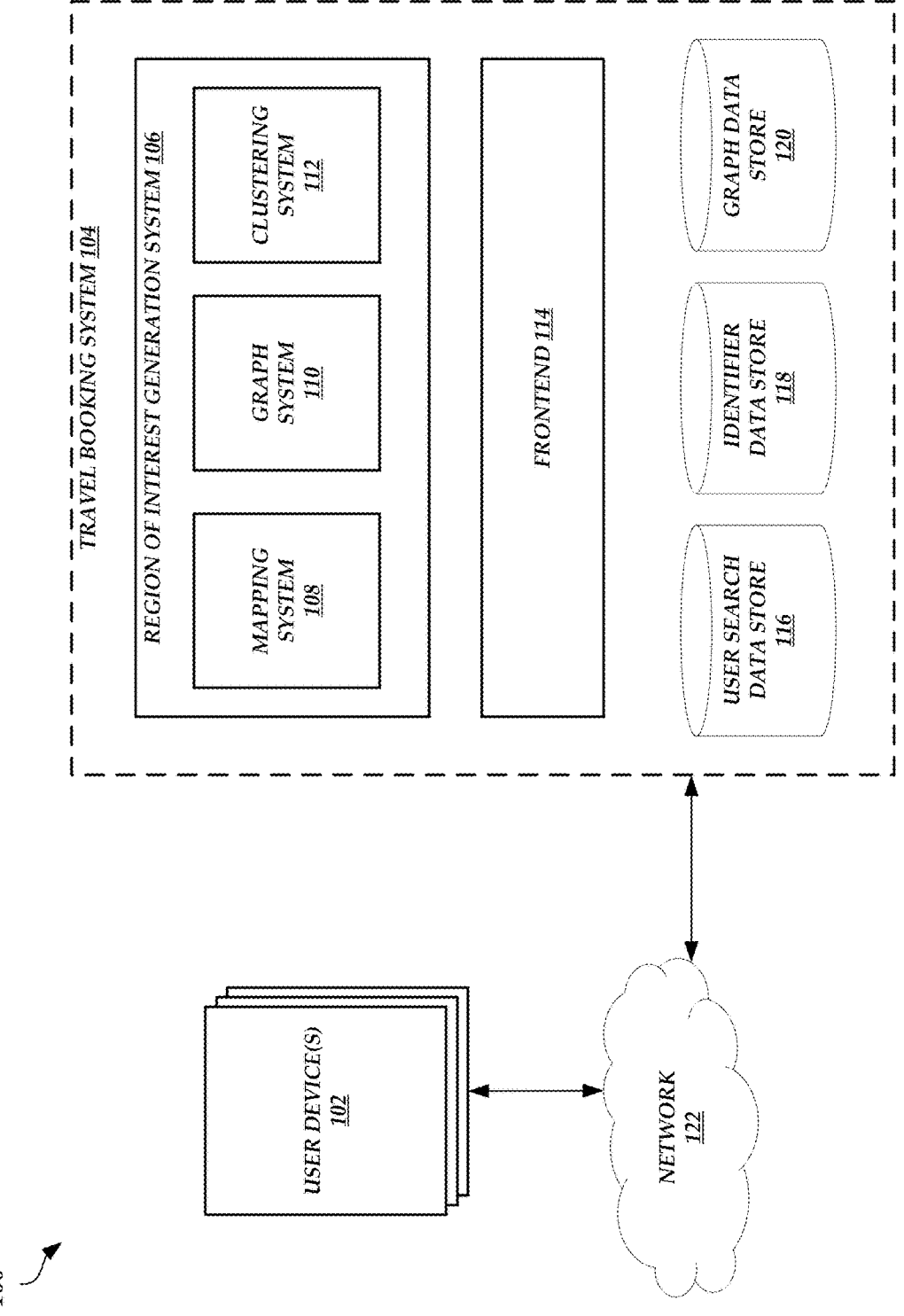
FIG. 1 is a schematic block diagram of an example network environment in which a region of interest (ROI) generation system may operate, according to various aspects of the present disclosure.

Generally described, aspects of the present disclosure relate to efficient mechanisms for organizing geographical entities within region of interest (ROI) clusters in a hierarchical and scalable graph. Specifically, a region of interest generation system and related features are described to integrate user search data in clustering geographical locations within the region of interest. When utilizing travel booking websites, users often browse or search for a number of related locations, often geographically related. These locations may indicate a natural "market" or cluster of locations that may be considered relevant to each other. Utilizing this user data may provide the region of interest system with improved organization and clustering of geographical locations.

In the context of travel booking services, geographically-defined regions of interest may be useful in organizing location-based items (e.g., hotels, rental properties), defining relevant competitor markets, and the like. To define a region of interest, clustering systems operate by aggregating geographical locations (e.g., cities, states, regions) into a "cluster" representing the region of interest within a geographical boundary. Existing clustering systems may attempt to organize geographic entities into markets on a solely geographic basis. For example, these systems may simply break down a larger geographic area into smaller regions based on existing boundaries or other delineated divisions (e.g., city limits of Paris). In addition, existing systems often rely on human or user input to delineate a region of interest. For example, user-drawn boundaries or manual selection of existing geographical locations for inclusion within a region of interest may be relied upon by existing clustering systems. These systems attempt to organize geographical entities based on manually created market boundaries (such as by a marketing analytics team), and may favor inventory management concerns in delineating a relevant market area. For example, under this type of system, the presence of numerous property items within a particular region may be grouped together as a single market. However, manually-driven clustering systems can suffer from overlaps or inefficiencies in defining market boundaries. Markets in an existing boundary-type system may result in unbalanced resource distribution (e.g., densely populated areas v. sparsely populated areas) and/or complex polygonal-shaped market boundaries. In addition, human-provided boundaries may overlap and/or lack clear delineation. Because inventory-based organization systems may be defined by a marketing analytics team, market boundaries may need to be updated by users often. As such, redundant geographical entity organization and may result in increased computational costs and storage costs needed to define and retrieve information. In addition, latency issues may arise from the time needed to process and scale disorganized clusters.

Embodiments of the present disclosure address these challenges by providing a highly efficient and comprehensive system for clustering and organizing geographical entities or locations in a hierarchical graph. As utilized herein, a geographical entity may refer to any place associated with a geographical location (e.g., Paris, France, Europe). In addition, geographical entities may be associated with and exist at various resolutions (e.g., city, country, continent). In the context of travel booking services, geographical entities may be organized by clustering systems that aim to define smaller areas within a larger geographical area. Specifically, embodiments disclosed herein provide for a region of interest generation system to integrate user search data in clustering geographical locations at various resolutions within the hierarchical graph. As noted above, users often browse or search for a number of related locations on travel booking websites that are often geographically related. These locations may indicate a natural "market" or cluster of locations that may be considered relevant to each other, e.g., a region of interest. As such, clustering based on user search data may provide location groupings that capture a natural region of interest. By integrating user search data in geographical entity organization, the system described herein provides for improved organization and clustering of geographical entities within regions of interest.

In a first part, the region of interest (ROI) generation system may generate a graph containing geographical entities and the relationships between each geographical entity. Specifically, each geographical entity can be represented as a node, and the relationships between geographical entities may be represented as edges between nodes. Each edge may represent the relationship between the two geographical entities as informed by the user search data associated with both geographical entities. In some examples, edges are weighted based on an occurrence of both geographical entities appearing as search items within a user session. In addition, the ROI generation system may generate multiple levels within a graph corresponding to various resolutions of geographical entities. For example, a graph may represent a hierarchical organization such that certain (e.g., nesting neighborhood nodes within a city node).

In a second part, the ROI generation system may cluster geographical entities within the hierarchical graph into relevant markets. In some embodiments, the system takes into account user search data in clustering geographical entities. For example, as noted above, the relationship between geographical entities may be represented within the graph as weighted edges, the edge weight associated with search session occurrence. Geographical entities with higher edge weights can be grouped together according to clustering metrics or algorithms. In addition, the ROI generation system may group each geographical entity within a cluster such that clusters are non-overlapping per resolution. This allows the ROI generation system to generate market clusters at various resolutions without overlap between clusters, and allows each geographical entity to exist in various clusters at across the entire hierarchical graph.

FIG. 1 is a schematic block diagram of an example network environment 100 in which a region of interest (ROI) generation system 106 may operate. The ROI generation system 106 may be configured to generate a hierarchical graph for clustering and organizing geographical entities.

As shown in FIG. 1, the network environment 100 includes user device(s) 102 (hereinafter referred to as "user device 102" for ease of reference), travel booking system 104, and network 122. Travel booking system 104 may include the ROI generation system 106, frontend 114, user search data store 116, identifier data store 118, and graph data store 120. The components of the travel booking system 104 within the network environment 100 may be communicatively coupled via network 122. In addition, network 122 may connect the device(s) 102 to ROI generation system 106 and various components of the region of interest generation system 106. The network environment 100 and components of network environment 100 can include various hardware components and software components and can provide functionality as described further herein.

In various aspects, communications among the various components of the example network environment 100, travel booking system 104, and ROI generation system 106 may be accomplished via any suitable device, systems, methods, and/or the like. For example, the ROI generation system 106 may communicate with the user device 102, frontend 114, any of the datastores via any combination of the network 122 or any other wired or wireless communications networks, method (e.g., Bluetooth, WiFi, infrared, cellular, and/or the like), and/or any combination of the foregoing or the like. As further described below, network 122 may comprise, for example, one or more internal or external networks, the Internet, and/or the like.

The network 122 of the network environment 100 can include any appropriate network, including wired network, wireless network, or combination thereof. For example, network 122 may be a personal area network, local area network, wide area network, cable network, satellite network, cellular network, or any other such network or combination thereof. As a further example, the network 122 may be a publicly accessible network of linked networks, possibly operated by various distinct parties, such as the Internet. Protocols and components for communicating via the Internet or any other types of communication networks are known to those skilled in the art of computer communications and thus, need not be described in more detail herein. In various embodiments, the network 122 may be a private or semi-private network, such as a corporate or university intranet. The network 122 may include one or more wireless networks, such as a Global System for Mobile Communications (GSM) network, a Code Division Multiple Access (CDMA) network, a Long-Term Evolution (LTE) network, C-band, mmWave, sub-6 GHZ, or any other type of wireless network. The network 122 can use protocols and components for communicating via the Internet or any of the other aforementioned types of networks. For example, the protocols used by the network 122 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications and thus, need not be described in more detail herein.

In various implementations, the network 122 can represent a network that may be local to a particular organization, e.g., a private or semi-private network, such as a corporate or university intranet. In some implementations, devices may communicate via the network 122 without traversing an external network, such as the Internet. In some implementations, devices connected via the network 122 may be walled off from accessing the Internet. As an example, the network 122 may not be connected to the Internet. Accordingly, e.g., the user device 102 may communicate with the ROI generation system 106 directly (via wired or wireless communications) or via the network 122, without using the Internet. Thus, even if the network 122 or the Internet is down, the ROI generation system 106 may continue to communicate and function via direct communications (and/or via the network 122).

User device 102 may be used to access various components of the travel booking system 104 and ROI generation system 106 over the network 122. User device 102 illustratively correspond to any computing device that provides a means for a user or admin to interact with components of the travel booking system 104 (e.g., ROI generation system 106, frontend 114, data stores). For example, a user, with user device 102, may access the ROI generation system 106 to update other processes for display in the frontend 114 (e.g., recommendation, updated geographical location information). In some examples, the frontend 114 may be implemented on user device 102. Of course, other activities may also be performed by a user with a user device 102. User device 102 may include user interfaces or dashboards that connect a user with a machine, system, or device. In various implementations, user device 102 include computer devices with a display and a mechanism for user input (e.g., mouse, keyboard, voice recognition, touch screen, and/or the like). In various implementations, the user device 102 include desktops, tablets, e-readers, servers, wearable device, laptops, smartphones, computers, gaming consoles, and the like. In some implementations, user device 102 can access a cloud provider network via the network 122 to view or manage their data and computing resources, as well as to use websites and/or applications hosted by the cloud provider network. Elements of the cloud provider network may also act as clients to other elements of that network. Thus, user device 102 can generally refer to any device accessing a network-accessible service as a client of that service.

To facilitate interaction between the ROI generation system 106 and the user devices 102 via the network 122, the travel booking system 104 includes a frontend 114. Frontend 114 may include any presentation layer (e.g., experience layer) such as a user-facing interface or platform through which a user of the user device 102 may access and interact with travel-booking services. In some implementations, the frontend 114 may be configured to render an "experience" on a user device 102 that a user (e.g., customer) may interact with to access travel-booking services. For example, the frontend 114 may include programs, code, or other applications that are displayed to a user through various client-side methods, such as a website on a browser, a mobile application, a tablet application, and the like. The frontend 114 may provide access to a range of travel-booking services, such as a search service for flights, hotels, lodging, car rentals, cruises, and other travel-related services, providing recommendations, creating itineraries, etc. In some examples, users search for and access travel-related items within the travel booking system 104 that are associated with various geographical locations (e.g., hotels in London, car rentals in Sicily.

In response to interaction between a user of the user device 102 and the frontend 114, the travel booking system 104 may capture user search data to be stored in the user search data store 116. User search data may correspond to any information relating to interaction between a user and the services of the travel booking system 104 rendered via the frontend 114, such as searching for location-based items (e.g., hotels, rentals), viewing location-based items, browsing, clicking, etc. User search data may include a log of activity with various items associated with geographical locations, and may include the geographical location, timestamps, click counts, click locations, time spent viewing pages/items, search strings, number of sessions, and the like. As described herein, users planning for a trip may utilize services of travel booking system 104 to search for items associated with a particular geographical location, depending on the desired destination. In some cases, users may explore surrounding geographical locations, such as nearby cities, in planning the trip. As such, a list of various places searched by the user may be recorded and stored by the travel booking system 104 as user search data.

Searches for geographical locations may be performed by a user within a single search session, defined as a particular period of time, a number of searches, etc. A session can refer to a collection of related searches, such as via the travel booking system 104. For example, a user may search for holiday vacation rentals in a particular area. The same user may browse for other rentals in a variety of sub-areas or nearby areas. Each of the rentals browsed by the user may be grouped into a single session. In some examples, a session includes searches performed by the user within a period of time, or with a certain cadence or frequency. In addition, the user may explicitly designate a session, such as by linking or accessing travel plans, lists, boards, pin(s), posts, collections, or other searches/items for inclusion within the session. Searches within a session can originate from different user devices and correlated with the same user (or user account). For example, a user may be logged onto their account on their laptop and begin to search for items at a first location. The user may then continue the search on their mobile phone, using the same account, for locations at the first or additional locations. Both searches may be included within the same session. Alternatively, the searches may be separated into separate sessions. User search data stored in user search data store 116 may include geographical locations searched by a user within a single session, multiple sessions, and the like. In addition, user search data may include search data from multiple users' interactions with the travel booking system 104 over single or multiple search sessions. User search data from various sources (e.g., websites, mobile applications) and multiple users may be pooled together and stored in the user search data store 116.

User search data store 116 may be stored at a remote location and accessible via the network 122. In some implementations, user search data store 116 may be accessible through one or more online services (e.g., website(s), application(s), API(s), or the like) such as via network 122. The user search data store 116 can be stored on multiple computing systems. In some implementations, the user search data store 116 can be stored on one or more remote servers and accessible via network 122. In some implementations, the user search data store 116 may be stored on one or more servers in multiple locations and accessible via network 122.

Identifier data store 118 may be configured to store identifiers or labels for association with geographical locations. As will be described in further detail below, geographical identifiers may be associated with geographical locations that have been searched by users (and stored in user search data store 116). Geographical locations associated with geographical identifiers may be further used by the ROI generation system 106 in graph generation and organization.

In some embodiments, the identifier data store 118 may store a predefined mapping or spatial indexing of all possible geographical locations. Grid systems, for example, may be stored in the identifier data store 118, and may be used to partition areas of the Earth into identifiable grid cells (e.g., hexagonal cells, square cells, triangular cells). In some embodiments, grid cells may be nested or hierarchically arranged. Geographical identifiers can include a name, a number, a latitude/longitude, a coordinate, an address, etc.

Graph data store 120 may be configured to store the graph(s) generated by the ROI generation system 106. As will be described with further detail below, the graph may store geographical locations (identified by the geographical identifiers) and the relationships between geographical locations. In some embodiments, geographical locations may be clustered together into clusters or groups within the graph. Clusters may represent a region of interest.

To generate and organize geographical locations, the travel booking system 104 may access the ROI generation system 106. The ROI generation system 106 may be configured to generate a hierarchical graph that clusters geographical locations into regions of interest on multiple resolutions. The ROI generation system 106 may access any component of the travel booking system 104, such as the frontend 114, user search data store 116, identifier data store 118, and the graph data store 120, etc.

The ROI generation system 106 may include various components to generate a hierarchical region of interest graph. As shown in FIG. 1, the ROI generation system 106 may include a mapping system 108, a graph system 110, and a clustering system 112. In some embodiments, ROI generation system 106 includes more or less components than as shown.

Mapping system 108 of the ROI generation system 106 may be configured to identify and label geographical locations. As noted herein, user search data recorded from user interactions with the frontend 114 is stored in the user search data store 116. User search data may include the names of places/locations that have been searched by users of the travel booking system 104. To identify search data as geographical locations, the mapping system 108 can associate each geographical location with a geographical identifier. Geographical identifiers may include a collection of non-overlapping and consistently sized geographical identifiers that span the globe, such as the identifiers stored in the identifier data store 118. In some embodiments, the identifier data store 118 stores a predefined mapping or spatial indexing of all possible geographical locations. Geographical identifiers can be stored in the identifier data store 118, and may be used to partition areas of the Earth into identifiable grid cells (e.g., hexagonal cells, square cells, triangular cells). In some embodiments, grid cells are nested or hierarchically arranged. Mapping system 108 may associate each geographical location with unique geographical identifiers (e.g., the grid cells).

Once geographical locations are associated with an identifier, graph system 110 of the ROI generation system 106 may be configured to generate a graph. Specifically, the graph system 110 may generate a graph utilizing the locations accessed from the user search data store 116 and associated with geographical identifiers by the mapping system 108. To generate a graph, the mapping system 108 may represent geographical locations as nodes. Each node may be identified by its geographical identifier and may store any information pertaining to that geographical location, such as name, location data, coordinates, associated inventory items, nested information about sub-nodes, and the like. The graph may be stored in the graph data store 120.

Clustering system 112 of the ROI generation system 106 can cluster nodes of the graph generated by the graph system 110. As noted herein, clusters may represent a region of interest. In some embodiments, the clustering system 112 may cluster a subset of nodes of the graph into non-overlapping clusters based on a clustering metric. Each cluster may contain a number of nodes that are relevant to each other. In some examples, the clustering system 112 utilizes a clustering metric, such as the Louvain algorithm, to detect a cluster of nodes. In addition, the clustering system 112 can cluster nodes at various resolutions. To do so, in some examples, the clustering system 112 runs clustering algorithm or metric various times at differing levels of granularity to identify a set of sub-graphs/clusters. By clustering the nodes at various resolutions, the clustering system 112 may cluster each node into non-overlapping clusters, such that each node belongs to a single cluster per resolution.

Though FIG. 1 illustrates only one data source, in practical implementations, the network environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the network environment 100, the travel booking system 104 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the network environment 100 can include on-prem and cloud-based computing resources, or only cloud-based resources. For example, an entity may have on-prem computing devices and a private cloud. In this example, the entity operates the travel booking system 104 and can choose to execute the travel booking system 104 on an on-prem computing device or in the cloud. In another example, a provider entity operates the travel booking system 104 in a public cloud and provides the functionality of the travel booking system 104 as a service, for example under a Software-as-a-Service (Saas) model, to entities that pay for the user of the service on a subscription basis. In this example, the provider entity can provision a separate tenant (or possibly multiple tenants) in the public cloud network for each subscriber entity, where each tenant executes a separate and distinct instance of the travel booking system 104. In some implementations, the entity providing the travel booking system 104 is itself subscribing to the cloud services of a cloud service provider. As an example, a first entity provides computing resources under a public cloud service model, a second entity subscribes to the cloud services of the first provider entity and uses the cloud computing resources to operate the travel booking system 104, and a third entity can subscribe to the services of the second provider entity in order to use the functionality of the travel booking system 104. In this example, the data sources are associated with the third entity, users accessing the travel booking system 104 are associated with the third entity, and the analytics and insights provided by the travel booking system 104 are for purposes of the third entity's operations.

Figure 2:
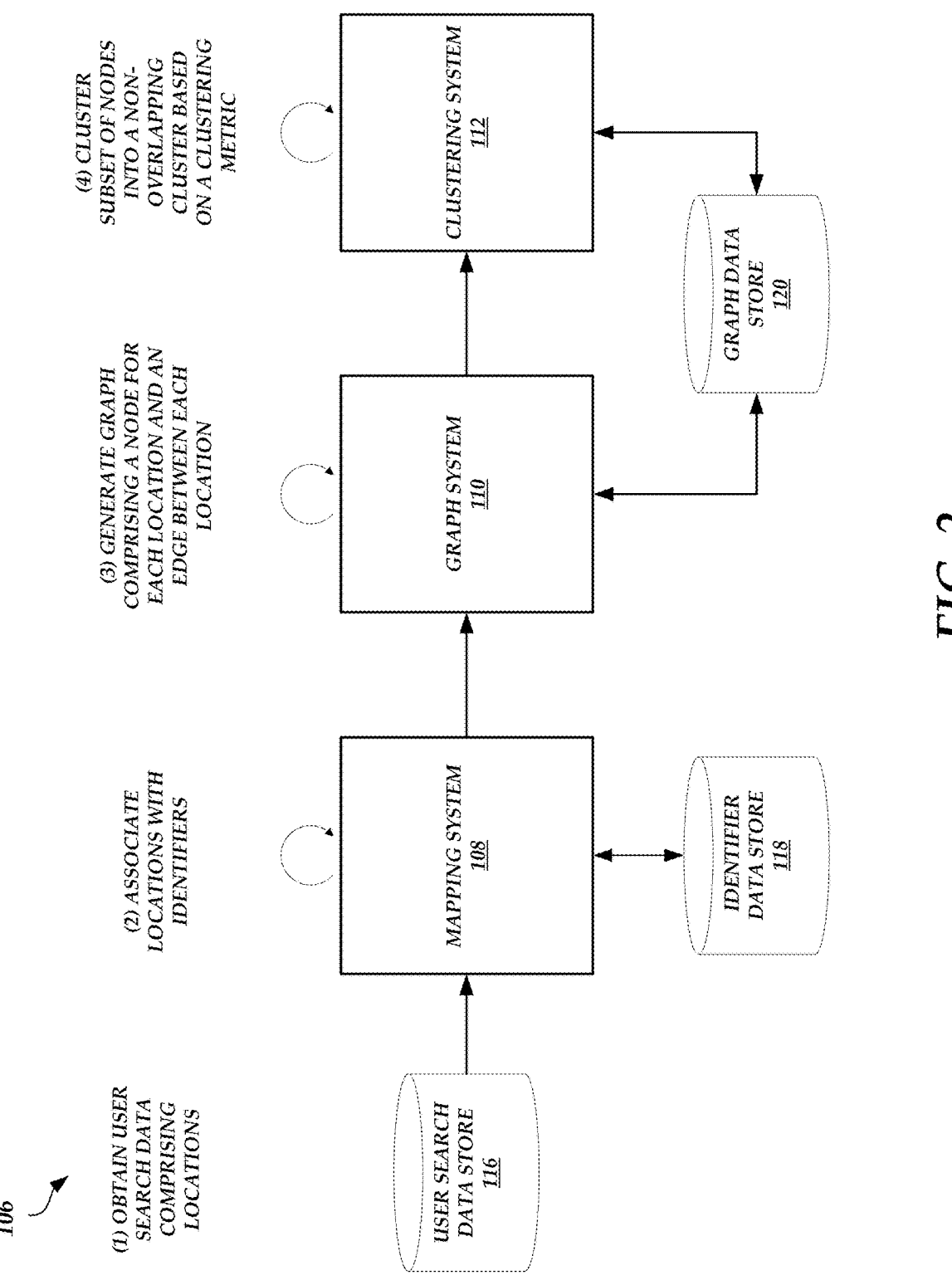
FIG. 2 is a block diagram of an example data flow process in which the ROI generation system may operate, according to various aspects of the present disclosure.

FIG. 2 is a block diagram of an example data flow process in which the ROI generation system 106 may operate to generate and organize geographical locations in a scalable hierarchical graph.

At (1), the ROI generation system 106 obtains user search data comprising locations. As noted herein, in response to interaction between a user of the user device 102 and the frontend 114, the travel booking system 104 captures user search data to be stored in the user search data store 116. User search data includes any information relating to this interaction, such as a log of activity with various items associated with geographical locations, and may include the geographical location, timestamps, click counts, click locations, time spent viewing pages/items, search strings, number of sessions, and the like. In some embodiments, the user search data corresponds to locations searched by the user via the travel booking system 104. In addition, user search data may include searched locations from a single session, multiple session, single user, multiple users, etc. User search data from various sources and/or various users may be pooled together and stored in the user search data store 116.

At (2), the ROI generation system 106 associates locations with geographic identifiers. At this step, the mapping system 108 identifies locations (from a text string of the user search data) as corresponding to a recognized or verified geographical location. Geographic identifiers may include labels, names, or other indicators to be associated with user search data locations. In some embodiments, the mapping system 108 accesses the identifier data store 118 to associate locations with stored geographic identifiers.

As described above, the identifier data store 118 may store a predefined spatial indexing (e.g., grid system) to partition some or all possible geographical areas of the Earth into grid cells. For example, geographical identifiers can be stored in the identifier data store 118, and may be used to partition areas of the Earth into identifiable grid cells (e.g., hexagonal cells, square cells, triangular cells). In some embodiments, grid cells are nested or hierarchically arranged. In some embodiments, at (2), mapping system 108 associates each geographical location with unique geographical identifiers (e.g., the grid cells).

At (3), the graph system 110 generates a graph to organize geographical locations and the relationships between each geographical location. Specifically, the graph system 110 generates a graph utilizing the locations accessed from the user search data store 116 and associated with geographical identifiers by the mapping system 108.

To generate a graph, the mapping system 108 represents geographical locations as nodes. Each node may be identified by its geographical identifier and may store any information pertaining to that geographical location, such as name, location data, coordinates, associated inventory items, nested information about sub-nodes, and the like. The graph is stored in the graph data store 120.

As a non-limiting example, the graph system 110 generates a graph based on the following example user search data based upon three separate users. User 1 may search (using travel booking system 104) for the following locations: Los Angeles, San Diego, Anaheim. Similarly, User 2 may search for Los Angeles, San Diego, Irvine. User 3 may search for Los Angeles, Irvine, San Diego, La Jolla. In this example, the mapping system 108 associates each of the locations with a geographical identifier according to processes outlined in (2). In addition, graph system 110 generates a graph including a node for each of the locations searched: Los Angeles, San Diego, Anaheim, Irvine, La Jolla, Pacific Beach. Each of these locations may store any information pertaining to that location. In addition, certain nodes may be nested within other nodes. For example, because La Jolla is considered a neighborhood within San Diego, the node pertaining to La Jolla may be nested within the node pertaining to San Diego. In addition, each node may be nested within a larger node pertaining to Southern California, California, United States, etc.

In addition to generating nodes, the graph system 110 represents the relationship between geographical locations as edges between nodes. Each edge may be weighted based on various measures stemming from the user search data. In one example, each edge may be weighted based on a pair-wise co-occurrence of searched destinations across all users. Specifically, edges may be weighted based on the occurrence of both geographical locations appearing as search items within a single session across all users. Based on the example above, the graph system 110 generates nodes pertaining to all locations searched by the three separate users (Los Angeles, San Diego, Anaheim, Irvine, La Jolla, Pacific Beach). In addition, the graph system 110 weights the edge between each geographical location based on a co-occurrence of each geographical location across each search. For example, it appears that San Diego and Irvine have been searched in the same session by both User 2 and User 3. As such, the graph system 110 may take these co-occurrences into account when weighting the edge between San Diego and Irvine. In another example, it appears that Los Angeles and San Diego have been searched in the same session by all three users. As such, the graph system 110 may assign the weight between the Los Angeles and San Diego edges higher than the edge between San Diego and Irvine, as there is greater co-occurrence of the two cities based on the user search data. Edges between cities that have low or no co-occurrence may have low edge weight.

It is noted that utilizing raw co-occurrences (such as in the example above) may lead to bias in the results towards popular destinations. To reduce bias and skewed edge weights, the graph system 110 may utilize various association metrics. For example, to account for large differences between total number of searches of individual destinations, the graph system 110 may utilize a point-wise mutual information (PMI) metric. PMI refers to a measure of association between events or items. Specifically, PMI may compare the probability of two events occurring together to the probability of the events if they were independent. Utilization of this or similar metrics may compensate for popular searches and attempt to standardize weights across the graph. For example, cities London and Edinburgh may be searched millions of times but are not often searched together. However, cities Camborne and Redruth may not be as popular searches but are often searched together. If the graph system 110 were to use a raw co-occurrence metric, London-Edinburgh edge weight would equal about the same as the Camborne-Redruth edge weight, due to the sheer number of searches for London-Edinburgh that outweigh the searches for Camborne-Redruth. As such, utilization of the PMI metric may account for popular searches to reduce bias towards these destinations.

In response to the generation of a graph, the ROI generation system 106 may cluster locations into regions of interest. Regions of interest may be represented in the graph as a cluster of nodes. As such, at (4), the clustering system 112 clusters a subset of nodes of the graph into non-overlapping clusters based on a clustering metric. Each cluster may contain a number of nodes that are relevant to each other and/or considered a "community" within a larger network. In some examples, the clustering system 112 utilizes a clustering metric, such as the Louvain algorithm, to detect a cluster of nodes. Utilization of the Louvain algorithm may maximize modularity, e.g., the fraction of edges that fall within a module minus the expected fraction if edges were distributed at random.

In addition, the clustering system 112 clusters nodes at various resolutions. To do so, the clustering system 112 runs a clustering algorithm or metric various times at differing levels of granularity to identify a set of sub-graphs/clusters. By clustering the nodes at various resolutions, the clustering system 112 may cluster each node into non-overlapping clusters, such that each node belongs to a single cluster per resolution. For example, SoHo, Chelsea, and West Village—all considered neighborhoods in Manhattan according to the geographical identifiers, NYC—may all be clustered by the clustering system 112 into a single neighborhood-level cluster. At this level, the clustering system 112 may only group each neighborhood into a single cluster. In addition, Manhattan—a borough of New York City—may be grouped by the clustering system 112 into a larger cluster comprising all five boroughs (Manhattan, Queens, Brooklyn, Bronx, Staten Island). In this example, Chelsea belongs to a first cluster at the neighborhood level, Chelsea may also be associated with a second cluster at the borough level.

In some embodiments, ROI generation system 106 utilizes the clustering of nodes to generate insights. Insights may include any information based on the non-overlapping cluster, such as inventory items located within the non-overlapping cluster, boundary information, map information, etc. In one example, metrics and information from the generated hierarchical tree(s) (e.g., clusters, locations) can be provided to third parties, such as providers, associated entities, and the like. Metrics/information can include any information related to the clusters, such as size, shape, area, location, density, etc. In another example, the ROI generation system 106 may be configured to provide recommendations to an end user or consumer. For example, a user might be searching for hotels in Seoul, Korea. To provide hotel recommendations, the travel booking system 104 may access a hierarchical graph (e.g., relating to Korea) stored in the graph data store 120. The hierarchical graph may indicate clusters within Seoul relating to various neighborhoods that are often searched together by users. Gangnam and Itaewon, for example, are two popular neighborhoods often searched together by tourists and may, in this example, be grouped by the ROI generation system 106 into a cluster. The ROI generation system 106, working with other components of the travel booking system 104, may access properties in both neighborhoods to display to the user. In some embodiments, the insight is output to the user for display or interaction in the frontend 114. In one example, the ROI generation system 106 may generate an insight related to a number of property items (e.g., hotels) within a certain region of interest. Additionally or alternatively, the ROI generation system 106 generates an insight based on a request.

Figure 3A:
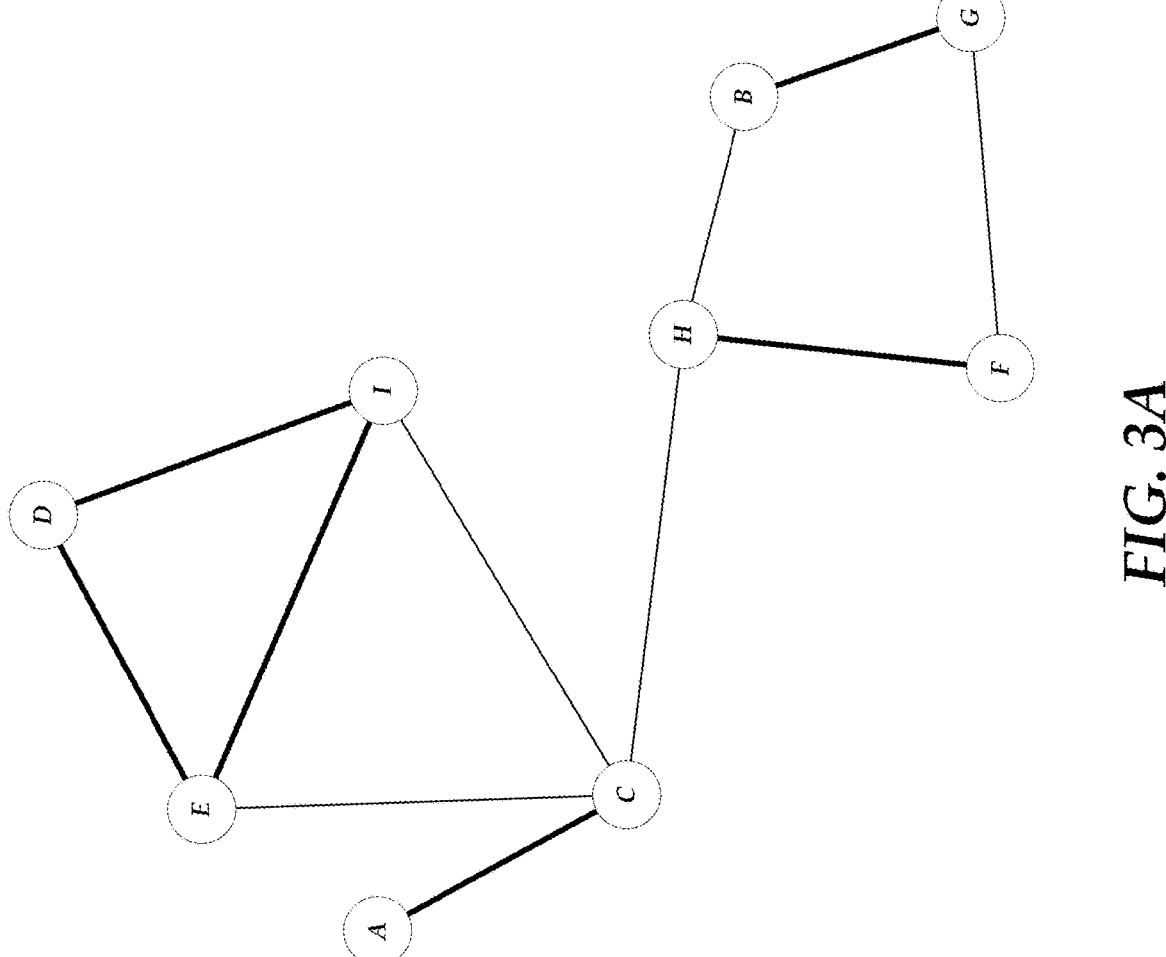
FIGS. 3A-3C are examples of a hierarchical graph generated by the ROI generation system, according to various aspects of the present disclosure.
Figure 3A:
Figure 3B:
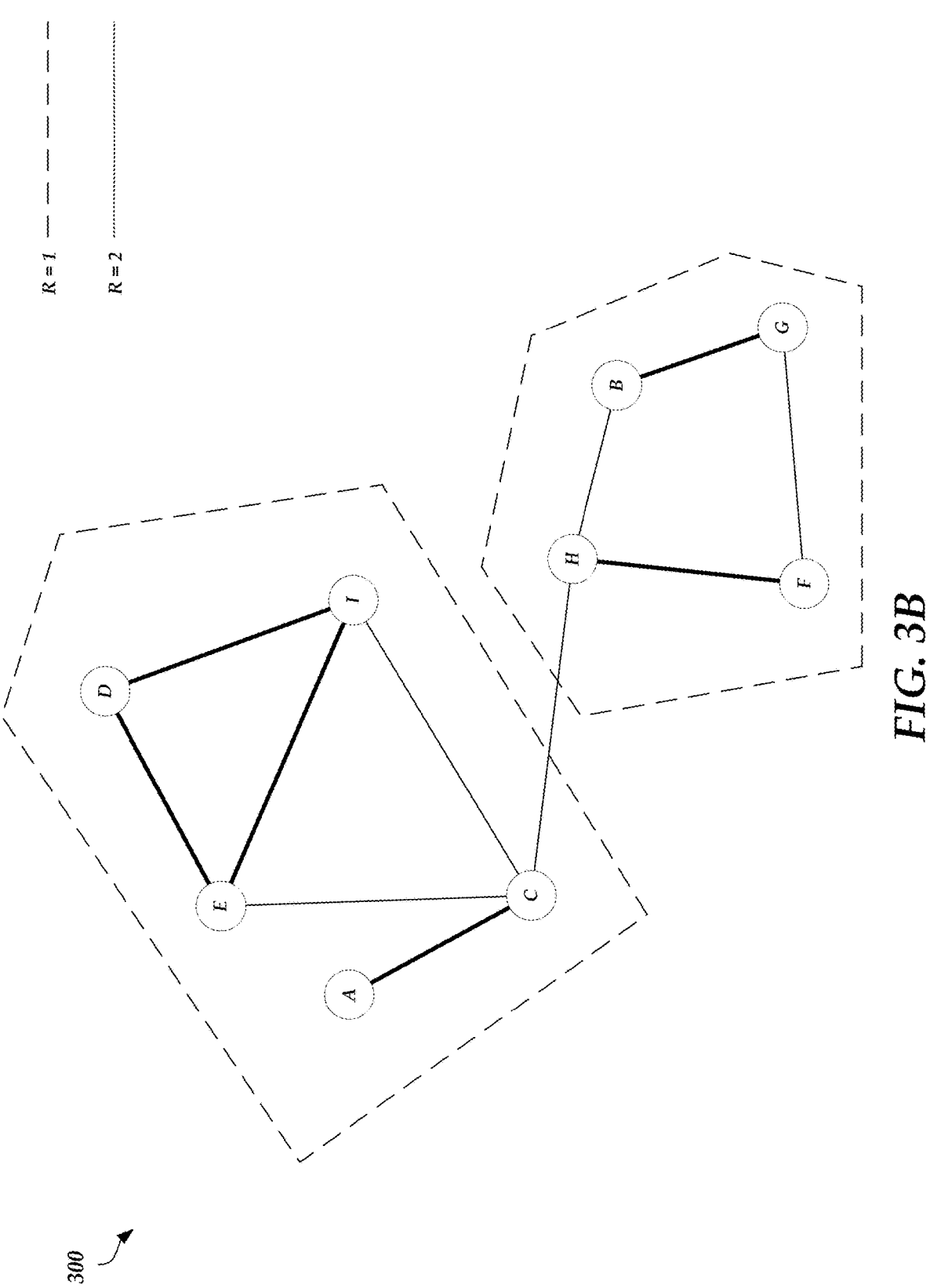
Figure 3C:
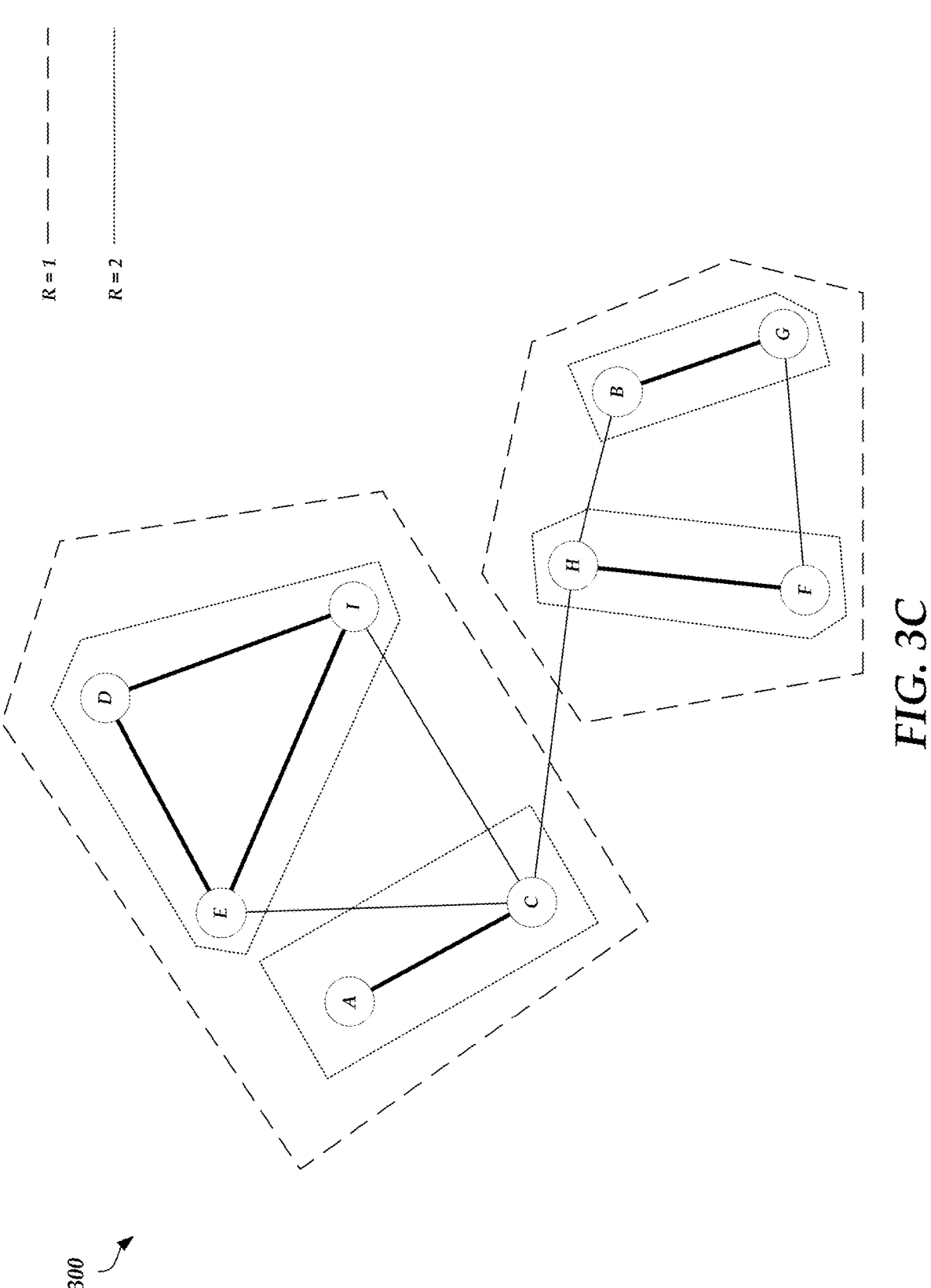

FIGS. 3A-3C are examples of a hierarchical graph generated by the ROI generation system 106, according to various aspects of the present disclosure.

FIG. 3A illustrates an example hierarchical graph 300 with nodes A-I. Each node A-I may represent a geographical location that has been searched by user(s) of the travel booking system 104, according to the processes outlined above. In addition, nodes representing geographical locations may be generated from user search data (stored in user search data store 116) and associated with geographical identifiers by the mapping system 108. Nodes A-I may represent various geographical locations at various resolutions. For example, certain nodes may represent cities, neighborhoods etc.

In some embodiments, edges between nodes of the hierarchical graph 300 are weighted according to processes described with reference to previous FIGs. To assign weight between two nodes, for example, the system may take into account user search data from user search data store 116 related to the two nodes. In one example, each edge is weighted based on a pair-wise co-occurrence of searched destinations across all users. In other words, edges can be weighted based on the occurrence of both geographical locations appearing as search items across all users within a single session As shown in FIG. 3A, certain edges between nodes A-I are weighted more heavily than other edges, illustrated by bolded lines. In some embodiments, certain nodes do not have edges between them. This may indicate that the two nodes have not been searched in the same session by any user.

FIG. 3B illustrates an example hierarchical graph 300 with clusters at a first resolution. In some examples, the first resolution (R=1) represents a geographical level at a first granularity. As shown, certain nodes are grouped into multiple clusters. Nodes are grouped into non-overlapping clusters such that nodes only belong to a single cluster at the first resolution. Nodes A, C, D, E, and I are in a first cluster, and nodes F, G, B, and H are in a second cluster.

FIG. 3C illustrates an example hierarchical graph 300 with clusters at a second resolution. The second resolution (R=2) represents a geographical level with more granularity than the first resolution. As shown, certain nodes are grouped into multiple clusters with the existing clusters (at R=1). For example, nodes A and C are in a first sub-cluster, nodes D, E, and I are in a second sub-cluster. In addition, nodes H and F are in a third sub-cluster and nodes B and G are in a fourth sub-cluster. Similar to above, nodes are grouped into non-overlapping clusters such that nodes only belong to a single cluster at the first resolution.

Figure 4:
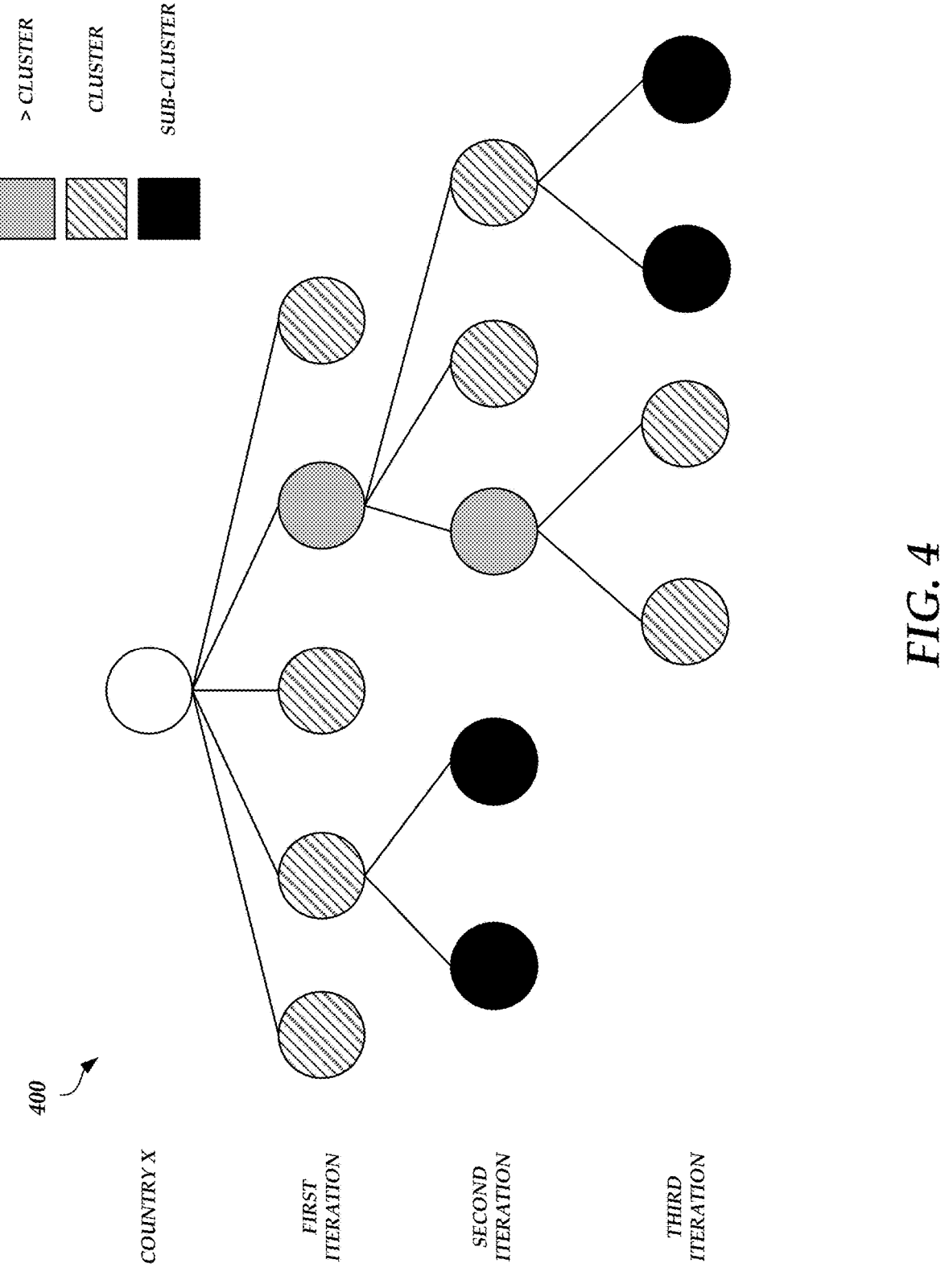
FIG. 4 is an example output of the ROI generation system illustrating a country-specific tree of clusters, according to various aspects of the present disclosure.

FIG. 4 is an example output of the ROI generation system 106 illustrating a country-specific tree of clusters. Tree 400 represent clusters and sub-clusters generated and grouped by the ROI generation system 106 within Country X.

As shown in FIG. 4, Country X is represented by a node at the top of the tree 400. Each circle of tree 400 represent clusters (or groupings of geographical locations) within Country X generated by the ROI generation system 106. As described herein, the processes carried out by the ROI generation system 106 may be iteratively performed on the same geographical location (e.g., within a country). Each iteration of the processes carried out by the ROI generation system 106 may expand the tree 400 and create additional nested clusters within existing clusters. This is shown in tree 400 by the multiple layers of clusters at each iteration level.

After a first iteration, the ROI generation system 106 generates five clusters (or areas) in tree 400 as stemming from Country X. As shown by the key, the striped circles in tree 400 represent clusters generated by the ROI generation system 105 according to processes described herein. In addition, the gray circles in tree 400 represent areas of Country X that are considered too large to be designated as a cluster ("\>Cluster"). Clusters generated from the first iteration may contain any number of geographical locations, such as any combination of cities, neighborhoods, provinces (at various resolutions).

After a second iteration, the ROI generation system 106 generates additional nested areas, clusters, or sub-clusters (shown as the black circles). Sub-clusters may be nested within clusters, which may be nested within areas (>clusters). As shown, the ROI generation system 106 may generate sub-clusters nested within a cluster. All children or sub-clusters may be nested within a single parent cluster, such that a location belongs to one cluster at each level.

After a third iteration, the ROI generation system 106 generates additional children clusters (e.g., sub-clusters) that are nested within the previously generated clusters. This process may continue as the ROI generation system 106 iteratively executes processes to generate additional children clusters. Although in FIG. 4, there are three iterations shown within Country X, there may be more or less iterations performed.

Figure 5:
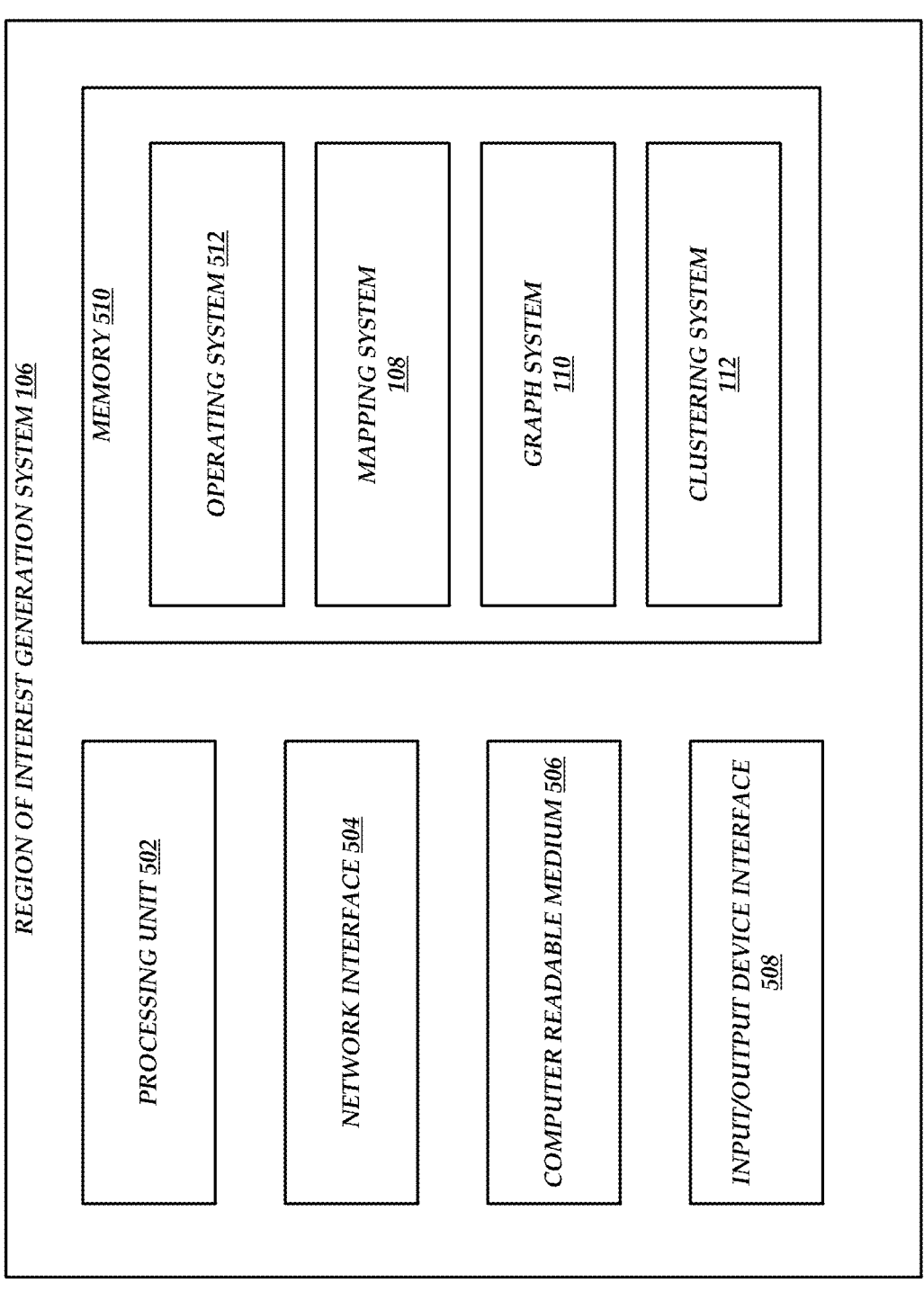
FIG. 5 is a block diagram illustrating components of an example computing system that can be used to implement the various systems and methods described herein.

FIG. 5 is a block diagram illustrating components of an example computing system that can be used to implement the various systems and methods described herein.

The general architecture of the system depicted in FIG. 5 includes an arrangement of computer hardware and software that may be used to implement aspects of the present disclosure. The hardware may be implemented on physical electronic devices, as discussed in greater detail below. The system may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1. As illustrated, the system includes a processing unit 502, a network interface 504, a computer-readable medium drive 506, and an input/output device interface 508, and memory 510, all of which may communicate with one another by way of a communication bus.

The network interface 504 may provide connectivity to one or more networks or computing systems. The processing unit 502 may thus receive information and instructions from other computing systems or services via the network. The processing unit 502 may also communicate to and from memory 510 and further provide output information for an optional display (not shown) via the input/output device interface 508. The input/output device interface 508 may also accept input from an optional input device (not shown).

The memory 510 may contain computer program instructions (grouped as units in some embodiments) that the processing unit 502 executes in order to implement one or more aspects of the present disclosure, along with data used to facilitate or support such execution. While shown in FIG. 5 as a single set of memory 510, memory 510 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 510 may store an operating system 512 that provides computer program instructions for use by the processing unit 502 in the general administration and operation of the ROI generation system 106. The memory 510 may further include computer program instructions and other information for implementing aspects of the present disclosure. For example, in one embodiment, the memory 510 includes the operating system 512, the mapping system 108, the graph system 110, and the clustering system 112.

Mapping system 108, graph system 110, and clustering system 112 within the memory 510 each represent code to execute the processes described to each respective component above.

The system of FIG. 5 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 6 as a ROI generation system 106, similar components may be utilized in some embodiments to implement other devices shown in the ROI generation system 106 of FIG. 5.

FIG. 6 is a flow diagram showing an example routine 600 for clustering and organizing geographical locations within a hierarchical graph. Routine 600 may be executed by the ROI generation system 106 and various components of the ROI generation system 106. Specifically, the routine 600 may be executed by a processor, such as the processing unit 502, shown in FIG. 5.

At block 602, user search data may be obtained by the ROI generation system 106. In some embodiments, the user search data includes geographical locations. User search data includes any information relating to user interaction with the travel booking system 104, such as a log of activity with various items associated with geographical locations, and may include the geographical location, timestamps, click counts, click locations, time spent viewing pages/items, search strings, number of sessions, and the like. In some embodiments, the user search data corresponds to locations searched by the user via the travel booking system 104. In addition, user search data may include searched locations from a single session, multiple session, single user, multiple users, etc. User search data from various sources and/or various users may be pooled together and stored in the user search data store 116.

At block 604, each geographical location is associated with a geographical identifier. As described herein, the identifier data store 118 may store a predefined spatial indexing (e.g., grid system) to partition all possible geographical areas of the Earth into grid cells. In some embodiments, each geographical identifier is one of a collection of non-overlapping and consistently sized geographical identifiers that span the globe. Geographical identifiers can be stored in the identifier data store 118, and may be used to partition areas of the Earth into identifiable grid cells (e.g., hexagonal cells, square cells, triangular cells). In some embodiments, grid cells are nested or hierarchically arranged. In some embodiments, at block 604, mapping system 108 associates each geographical location with unique geographical identifiers (e.g., the grid cells).

At block 606, a first graph is generated at a first resolution. In some embodiments, the first graph comprises nodes and edges at the first resolution. The first resolution may represent any geographical resolution within a particular geographical area. For example, the first resolution includes at least one of a country, a state, a region, a province, a territory, a city, a city-state, a neighborhood, a prefecture, a district, a county, or a community. A node for each geographical location may be associated with the first resolution, wherein each node is identified by the geographical identifier. An edge between each geographical location associated with the first resolution may be weighted based on a co-occurrence of each geographical location. In some examples, the co-occurrence comprises a number of times that each geographical location was searched within a single user session.

At block 608, a subset of nodes at the first resolution is grouped into a non-overlapping cluster based on a clustering metric. Geographical locations may be clustered according to processes described with reference to the previous figures. For example, user search data may indicate the relationship between various geographical locations. Specifically, geographical locations with a high co-occurrence of searches within search sessions may be considered related to each other. In addition, the clustering system 112 of the ROI generation system 106 may cluster a subset of nodes of the graph (e.g., hierarchical graph 400) into non-overlapping clusters based on a clustering metric to group geographical locations that are related to each other. Each cluster may contain a number of nodes that are relevant to each other and/or considered a "community" within a larger network, based on user search data. In some examples, the clustering system 112 may utilize a clustering metric, such as the Louvain algorithm, to detect a cluster of nodes. In some embodiments, each node belongs to only one cluster at each resolution.

At block 610, an insight based on the non-overlapping cluster may be generated for output to the user. Insights may include any information based on the non-overlapping cluster, such as inventory items located within the non-overlapping cluster, boundary information, map information, etc. In some embodiments, the insight is output to the user for display or interaction in the frontend 114. In one example, the ROI generation system 106 may generate an insight related to a number of property items (e.g., hotels) within a certain region of interest. Additionally or alternatively, the ROI generation system 106 generates an insight based on a request. In some embodiments, the insight relates to a recommended property item based on the non-overlapping cluster.

In some embodiments, ROI generation system 106 generates a second graph at a second resolution. In this case, the second resolution is at a higher resolution than the first resolution, such that the second resolution is at a higher level of granularity. The second graph in this example is nested within the first graph. Similar to the first graph, the second graph may include a node for each geographical location associated with the second resolution, wherein each node is identified by the geographical identifier and an edge between each geographical location associated with the second resolution. In addition, each edge is weighted based on a co-occurrence of each geographical location, wherein the co-occurrence comprises a number of times that each geographical location was searched within a single user session. Similar to the processes described with reference to block 608, the ROI generation system 106 may group a subset of nodes at the second resolution into a non-overlapping cluster based on the clustering metric.

What is claimed is:

1. A system, comprising:
a computer-readable storage medium storing program instructions; and
one or more processors configured to execute the program instructions to cause the system to:
obtain user search data, wherein the user search data includes geographical locations;
associate each geographical location with a geographical identifier;
generate a first graph at a first resolution, the first graph comprising:
a node for each geographical location associated with the first resolution, wherein each node is identified by the geographical identifier,
an edge between each geographical location associated with the first resolution, wherein the edge is weighted based on at least a number of times that each geographical location was searched within a single user session;
group a subset of nodes at the first resolution into a non-overlapping cluster based on a clustering metric; and
generate, for output to the user, an insight relating to a recommended property item based on the non-overlapping cluster.

2. The system of claim 1, wherein the one or more processors are configured to further cause the system to:

generate a second graph at a second resolution, wherein the second graph is nested within the first graph and comprises:
a node for each geographical location associated with the second resolution, wherein each node is identified by the geographical identifier, and
an edge between each geographical location associated with the second resolution, wherein each edge is weighted based on at least a number of times that each geographical location was searched within a single user session; and
group a subset of nodes at the second resolution into a non-overlapping cluster based on the clustering metric.

3. The system of claim 1, wherein the clustering metric includes a Louvain clustering method.

4. The system of claim 1, wherein each geographical identifier is one of a collection of non-overlapping and consistently sized geographical identifiers that span the globe.

5. The system of claim 2, wherein the first resolution and the second resolution corresponds to one of a country, a state, a region, a province, a territory, a city, a city-state, a neighborhood, a prefecture, a district, a county, or a community.

6. The system of claim 2, wherein each node belongs to only one cluster at each resolution.

7. A computer-implemented method, comprising:
obtaining user search data, wherein the user search data includes geographical locations;
associating each geographical location with a geographical identifier;
generating a first graph at a first resolution, the first graph comprising:
a node for each geographical location associated with the first resolution, wherein each node is identified by the geographical identifier,
an edge between each geographical location associated with the first resolution, wherein the edge is weighted based on a co-occurrence of each geographical location, wherein the co-occurrence comprises a number of times that each geographical location was searched within a single user session;
grouping a subset of nodes at the first resolution into a non-overlapping cluster based on a clustering metric; and
generate, for output to the user, an insight relating to a recommended property item based on the non-overlapping cluster.

8. The computer-implemented method of claim 7, further comprising:
generating a second graph at a second resolution, wherein the second graph is nested within the first graph and comprises:
a node for each geographical location associated with the second resolution, wherein each node is identified by the geographical identifier,
an edge between each geographical location associated with the second resolution, wherein each edge is weighted based on a co-occurrence of each geographical location, wherein the co-occurrence comprises a number of times that each geographical location was searched within a single user session; and
grouping a subset of nodes at the second resolution into a non-overlapping cluster based on the clustering metric.

9. The computer-implemented method of claim 7, wherein the method further comprises generating, for output to the user, an insight relating to a recommended property item based on the non-overlapping cluster.

10. The computer-implemented method of claim 8, wherein the first resolution and the second resolution corresponds to one of a country, a state, a region, a province, a territory, a city, a city-state, a neighborhood, a prefecture, a district, a county, or a community.

11. The computer-implemented method of claim 8, wherein the clustering metric includes a Louvain clustering method.

12. The computer-implemented method of claim 8, wherein each geographical identifier is one of a collection of non-overlapping and consistently sized geographical identifiers that span the globe.

13. The computer-implemented method of claim 9, wherein each node belongs to only one cluster at each resolution.

14. One or more non-transitory computer-readable media storing computer-executable instructions that, when executed by a processor of a computing device, cause the computing device to at least:

obtain user search data, wherein the user search data includes geographical locations;

associate each geographical location with a geographical identifier;

generate a first graph at a first resolution, the first graph comprising:

a node for each geographical location associated with the first resolution, wherein each node is identified by the geographical identifier, an edge between each geographical location associated with the first resolution, wherein the edge is weighted based on a co-occurrence of each geographical location, wherein the co-occurrence comprises a number of times that each geographical location was searched within a single user session;

group a subset of nodes at the first resolution into a non-overlapping cluster based on a clustering metric; and generate, for output to the user, an insight relating to a recommended property item based on the non-overlapping cluster.

15. The one or more non-transitory computer-readable media of claim 14, wherein the processor is configured to further cause the computing device to:

generate a second graph at a second resolution, wherein the second graph is nested within the first graph and comprising:

a node for each geographical location associated with the second resolution, wherein each node is identified by the geographical identifier, an edge between each geographical location associated with the second resolution, wherein each edge is weighted based on an occurrence of both geographical locations within the user search data; and group a subset of nodes at the second resolution into a non-overlapping cluster based on the clustering metric.

16. The one or more non-transitory computer-readable media of claim 14, wherein the processor is configured to further cause the computing device to generate, for output to the user, an insight based on the non-overlapping cluster.

17. The one or more non-transitory computer-readable media of claim 15, wherein the first resolution and the second resolution corresponds to one of a country, a state, a region, a province, a territory, a city, a city-state, a neighborhood, a prefecture, a district, a county, or a community.

18. The one or more non-transitory computer-readable media of claim 15, wherein the clustering metric includes a Louvain clustering method.

19. The one or more non-transitory computer-readable media of claim 15, wherein each geographical identifier is one of a collection of non-overlapping and consistently sized geographical identifiers that span the globe.

20. The one or more non-transitory computer-readable media of claim 16, wherein each node belongs to only one cluster at each resolution.

* * * * *